United States Patent
Wang et al.

(10) Patent No.: US 10,823,676 B2
(45) Date of Patent: Nov. 3, 2020

(54) NON-CONTACT TYPE SECURITY INSPECTION SYSTEM AND METHOD

(71) Applicant: NUCTECH COMPANY LIMITED, Beijing (CN)

(72) Inventors: Ankai Wang, Beijing (CN); Hongqiu Wang, Beijing (CN); Yumin Yi, Beijing (CN); Haihui Liu, Beijing (CN); Jianhong Zhang, Beijing (CN)

(73) Assignee: NUCTECH COMPANY LIMITED, Beijing (CN)

(*) Notice: Subject to any disclaimer, the term of this patent is extended or adjusted under 35 U.S.C. 154(b) by 0 days.

(21) Appl. No.: 16/467,037

(22) PCT Filed: Nov. 7, 2017

(86) PCT No.: PCT/CN2017/109733
§ 371 (c)(1),
(2) Date: Jun. 5, 2019

(87) PCT Pub. No.: WO2018/103487
PCT Pub. Date: Jun. 14, 2018

(65) Prior Publication Data
US 2019/0391080 A1    Dec. 26, 2019

(30) Foreign Application Priority Data
Dec. 8, 2016 (CN) .......................... 2016 1 1122379

(51) Int. Cl.
*G01J 3/44* (2006.01)
*G01N 21/65* (2006.01)

(52) U.S. Cl.
CPC ..... *G01N 21/65* (2013.01); *G01N 2201/0642* (2013.01)

(58) Field of Classification Search
CPC ............ G01N 21/65; G01N 2201/0642; G01J 3/0262; G01J 3/44
See application file for complete search history.

(56) References Cited

U.S. PATENT DOCUMENTS

| 2005/0206892 A1 | 9/2005 | Wang et al. | |
| 2010/0053606 A1* | 3/2010 | Matousek | G01J 3/44 356/301 |

(Continued)

FOREIGN PATENT DOCUMENTS

| CN | 101504371 A | 8/2009 |
| CN | 202471595 U | 10/2012 |

(Continued)

OTHER PUBLICATIONS

Ernad L.Izake et al.,"Standoff Raman spectrometry for the non-invasive detection of explosives precursors in highly fluorescing packaging", Oct. 27, 2012, total 8 pages, XP055703455.

(Continued)

*Primary Examiner* — Tarifur R Chowdhury
*Assistant Examiner* — Jonathon Cook
(74) *Attorney, Agent, or Firm* — Kilpatrick Townsend & Stockton, LLP

(57) ABSTRACT

The present disclosure relates to a non-contact type security inspection and method, the system including: a laser source for emitting probe light beams which penetrate through a container or a packaging and are irradiated onto an inspected object contained in the container or the packaging; an optical collection device for collecting an exciting light excited by the probe light beams on the inspected object; a spectrum analyzer for analyzing spectral characteristics of the exciting light collected by the optical collection device so as to determine characteristics of the inspected object; and a shielding apparatus for preventing at least part of the exciting light excited by the probe light beams on the container (Continued)

or the packaging from entering an induction area of the optical collection device.

18 Claims, 6 Drawing Sheets

(56) References Cited

U.S. PATENT DOCUMENTS

| | | |
|---|---|---|
| 2012/0194814 A1 | 8/2012 | Wang |
| 2013/0055697 A1 | 3/2013 | Deguchi et al. |
| 2014/0296668 A1* | 10/2014 | Sato .................. G01J 3/0202 600/317 |
| 2015/0185130 A1 | 7/2015 | Wang et al. |
| 2015/0185154 A1 | 7/2015 | Chen et al. |

FOREIGN PATENT DOCUMENTS

| | | |
|---|---|---|
| CN | 103743676 A | 4/2014 |
| CN | 104749155 A | 7/2015 |
| CN | 104749157 A | 7/2015 |
| CN | 105651312 A | 6/2016 |
| CN | 106525816 A | 3/2017 |
| CN | 206399836 U | 8/2017 |
| JP | 2010190595 A | 9/2010 |
| WO | 2008062185 A1 | 5/2008 |
| WO | 2013061590 A1 | 5/2013 |
| WO | 2014121389 A1 | 8/2014 |

OTHER PUBLICATIONS

Wiliiam J Olds et al., "Spatially offset Raman spectroscopy (SORS) for the analysis and detection of packaged pharmaceuticals and concealed drugs", May 12, 2011, total 9 pages, XP028284191.
Jin Yuxi, "Stray Light Analysis and Suppression in Fluorescence Detector" A Dissertation Submitted to Shanghai Jiao Tong University for the Degree of Master,Department of Physics Shanghai Jiao Tong University, Shanghai, P.R.China, total 83 pages, Jan. 15, 2011.

* cited by examiner

NON-CONTACT TYPE SECURITY INSPECTION SYSTEM AND METHOD

CROSS-REFERENCES TO RELATED APPLICATIONS

This application is the National Stage of International Application No. PCT/CN2017/109733, filed on Nov. 7, 2017, entitled "NON-CONTACT TYPE SECURITY INSPECTION SYSTEM AND METHOD", which claims priority to CN application No. 201611122379.9, filed with the Chines Patent Office on Dec. 8, 2016, the disclosure of which are incorporated herein by reference in their entireties.

FIELD

The present disclosure relates to the field of security inspection, and in particular to a non-contact type security inspection system and method.

BACKGROUND

When irradiating a gas, liquid or transparent sample with monochromatic light having a wavelength much smaller than the particle size of the sample, a large portion of the light is transmitted in the original direction, while a small portion is scattered at different angles to produce scattered light. When viewed in the vertical direction, in addition to Rayleigh scattering with the same frequency as the original incident light, there are several weak Raman spectrum lines that are distributed symmetrically and displaced from the incident light frequency, and this phenomenon is called the Raman scattering effect. Since the number of Raman spectrum lines, the magnitude of displacement, and the length of spectrum lines are directly related to the vibratory or rotational energy level of a sample molecule, information on the vibration or rotation of the molecule can be obtained by studying Raman spectrum.

Raman spectral analysis technique is a non-contact type spectral analysis technique based on the Raman scattering effect, which can qualitatively and quantitatively analyze compositions of a substance. Therefore, the technique has been applied to a variety of technical fields, such as substance identification, security inspection, and so on. Based on Raman spectral analysis technique, Raman spectrometer for security inspection has emerged. The Raman spectrometer includes three main parts: a laser, an external optical path system and a spectrometer. The exciting light emitted by the laser is sent to an inspected sample through the external optical path, and Raman exciting light is generated and then transmitted to the spectrometer through the external optical path system.

The Raman spectrometer has the following shortcomings in the detection: when a laser beam is irradiated onto a container or a packaging containing contents therein, there may be an excited fluorescence propagating backwards in an irradiation area (B) near a surface of the container or the packaging, and the fluorescence can be collected by a collection optical unit and then enter the spectrometer. It has been experimentally proved that the fluorescence will cause relatively significant interference to detection of actual signal and then affect inspection results.

The currently known solution is the solution of the company Cobalt. As shown in FIG. 1, a laser a20 emits a laser beam a24 which is incident on a container a12 containing an unknown liquid a14 therein as an inspected object, and enters the unknown liquid a14 to excite Raman scattering. A collection optical device collects a Raman exciting light from a sampling area a28 in the unknown liquid a14 through a collection optical path a29, transmits the collected light to a spectrum analyzer and then to a data processor. The main technical mean of this solution is that the collection optical path a29 of the Raman scattering light does not include a projection area a26 of the laser beam, in other words, the intersection of an incident optical path a24 and a wall of the container is separated from the intersection of a Raman scattering optical path and the wall of the container.

SUMMARY

The inventors have recognized that the solution mentioned in the background art can effectively reduce the fluorescence entering the collection optical path, but the degree of reduction is related to the positional relationship between the collection optical path and the irradiation area, and if they are relatively close to each other, the probability of collecting fluorescence excited on the container may increase. On the other hand, the solution has requirements on positions of the excitation beam and the collection optical path, thus causing a certain degree of restriction on the structural design of the security inspection device and resulting in an increase in the system size.

In view of this, the embodiments of the present disclosure provide a non-contact type security inspection system and method, which can effectively reduce the possibility of the exciting light of the probing light beams on the container or the packaging entering the collection optical path, and reduce the requirements on positions of the probing light beams and the collection optical path.

According to an aspect of the present disclosure, provided is a non-contact type security inspection system, including:

a laser source for emitting probe light beams which penetrate through a container or a packaging and are irradiated onto an inspected object contained in the container or the packaging;

an optical collection device for collecting an exciting light excited by the probe light beams on the inspected object;

a spectrum analyzer for analyzing spectral characteristics of the exciting light collected by the optical collection device so as to determine characteristics of the inspected object; and a shielding apparatus for preventing at least part of the exciting light excited by the probe light beams on the container or the packaging from entering an induction area of the optical collection device.

In some embodiments, the shielding apparatus is provided outside the container or the packaging.

In some embodiments, the shielding apparatus is provided adjacent to an outer surface of the container or the packaging.

In some embodiments, the shielding apparatus includes a light shielding baffle, and an extended plane of the light shielding baffle in a direction away from the container or the packaging and the induction area of the optical collection device are nonintersecting.

In some embodiments, the laser source is located outside a predetermined collection optical path defined by the optical collection device.

In some embodiments, an irradiation area of the container or the packaging irradiated by the probe light beams is located within a predetermined collection optical path defined by the optical collection device.

In some embodiments, one or more laser sources are configured to emit a plurality of probe light beams to the container or the packaging, and the shielding apparatus is provided close to each of the probe light beams outside the container or the packaging.

In some embodiments, the shielding apparatus includes first light shielding baffles having a cross section with an annular sector shape, and the first light shielding baffles corresponding to the probe light beams form a non-closed annular cross section shape.

In some embodiments, the laser source is configured to emit a probe light beam with a closed geometric cross section shape to the container or the packaging, and the shielding apparatus with a closed geometric cross section shape is provided adjacent to the laser beam outside the container or the packaging.

In some embodiments, the shielding apparatus includes a second light shielding baffle with a closed annular cross section shape.

In some embodiments, spectral characteristics of the exciting light excited by the probe light beams on the container or the packaging are stronger than spectral characteristics of an exciting light excited by the probe light beams on the inspected object.

In some embodiments, the spectrum analyzer includes a Raman spectrum analyzer for analyzing Raman spectral characteristics of a scattered light collected by the optical collection device.

According to another aspect of the present disclosure, provided is a non-contact type security inspection method based on Raman spectrum detection, including:

probe light beams being directed to penetrate through a container or a packaging and irradiated onto an inspected object contained in the container or the packaging;

collecting an exciting light excited by the probe light beams on the inspected object by an optical collection device; and analyzing spectral characteristics of the exciting light collected by the optical collection device so as to determine characteristics of the inspected object;

and at least part of the exciting light excited by the probe light beams on the container or the packaging is prevented from entering an induction area of the optical collection device by a shielding apparatus.

In some embodiments, the step of that probe light beams are directed to penetrate through a container or a packaging and be irradiated onto an inspected object contained in the container or the packaging includes:

the probe light beams are directed, from a laser source provided outside a predetermined collection optical path defined by the optical collection device, to penetrate through a container or a packaging and irradiated onto an inspected object contained in the container or the packaging.

In some embodiments, an irradiation area on the container or the packaging irradiated by the probe light beams is located within a predetermined collection optical path defined by the optical collection device.

In some embodiments, the step of that probe light beams are directed to penetrate through a container or a packaging and irradiated onto an inspected object contained in the container or the packaging includes:

a plurality of probe light beams or a probe light beam with a closed geometric cross section shape is directed from a laser source to penetrate through a container or a packaging and irradiated onto an inspected object contained in the container or the packaging.

In some embodiments, spectral characteristics of the exciting light excited by the probe light beams on the container or the packaging are stronger than spectral characteristics of an exciting light excited by the probe light beams on the inspected object.

In some embodiments, the step of analyzing spectral characteristics of the exciting light collected by the optical collection device includes: analyzing Raman spectral characteristics of a scattered light collected by the optical collection device.

Therefore, according to the embodiments of the present disclosure, by providing a shielding apparatus for preventing at least part of the exciting light excited by the probing light beams on the container or the packaging from entering an induction area of the optical collection device, the possibility of the exciting light excited by the probing light beams on the container or the packaging entering a collection optical path is effectively reduced, the interference with a spectral signal of the inspected object is significantly reduced, and it is not required that the probing light beams keeps away from the collection optical path, thus further reducing the requirements for setting positions of the probing light beams and the collection optical path.

BRIEF DESCRIPTION OF THE DRAWINGS

The drawings described herein are provided to provide a further understanding of the present disclosure, and constitute a part of the present disclosure. The illustrative embodiments of the present disclosure and the description thereof are for explaining the present disclosure and do not constitute an undue limitation to the present disclosure. In the drawings.

DETAILED DESCRIPTION OF THE INVENTION

Figure 1:
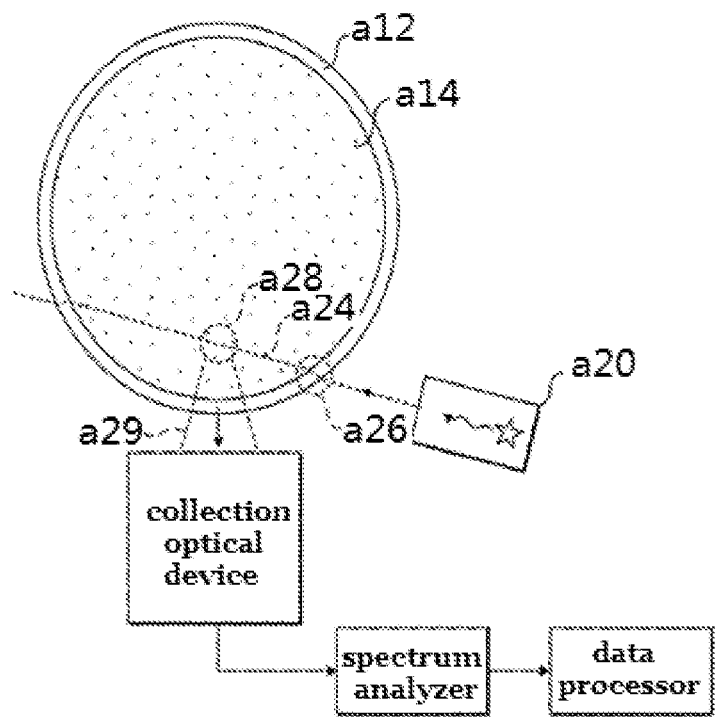
FIG. 1 is a schematic diagram of an existing non-contact type security inspection system.

The embodiments of the present disclosure will be clearly and completely described below with reference to the drawings in the embodiments of the present disclosure. Obviously, the described embodiments are only a part of the embodiments of the present disclosure, and not all of the embodiments. The following description of at least one exemplary embodiment is in fact merely illustrative, and in no way limits the disclosure and its application or use.

The relative arrangement of components and steps, numerical expressions and numerical values stated in the embodiments are not intended to limit the scope of the disclosure unless otherwise specified. Furthermore, it should be understood that the dimensions of the various parts shown in the drawings are not drawn in the actual scale relationship for the convenience of description. In all of the examples shown and discussed herein, any specific values are to be construed as illustrative only and not as restrictive. Accordingly, other examples of the exemplary embodiments may have different values. It should be noted that similar reference numerals and letters indicate similar items in the following drawings, and therefore, once an item is defined in one drawing, it is not required to be further discussed in the subsequent drawings.

Figure 2:
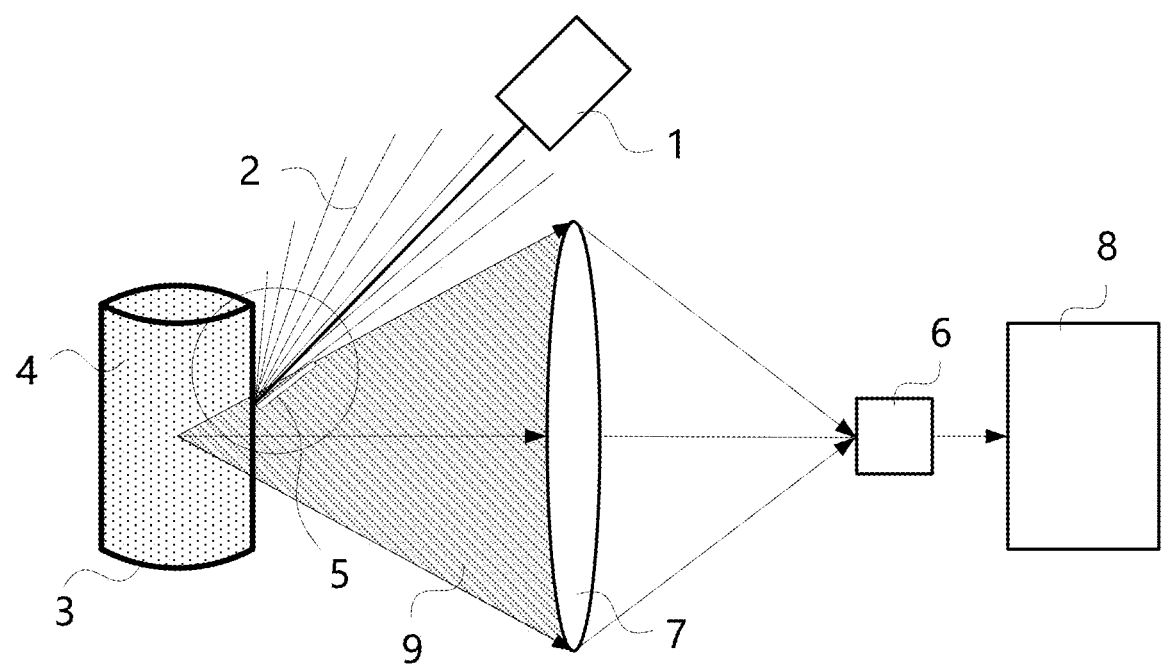
FIG. 2 is a schematic diagram of a non-contact type security inspection system according to an embodiment of the present disclosure.
Figure 3:
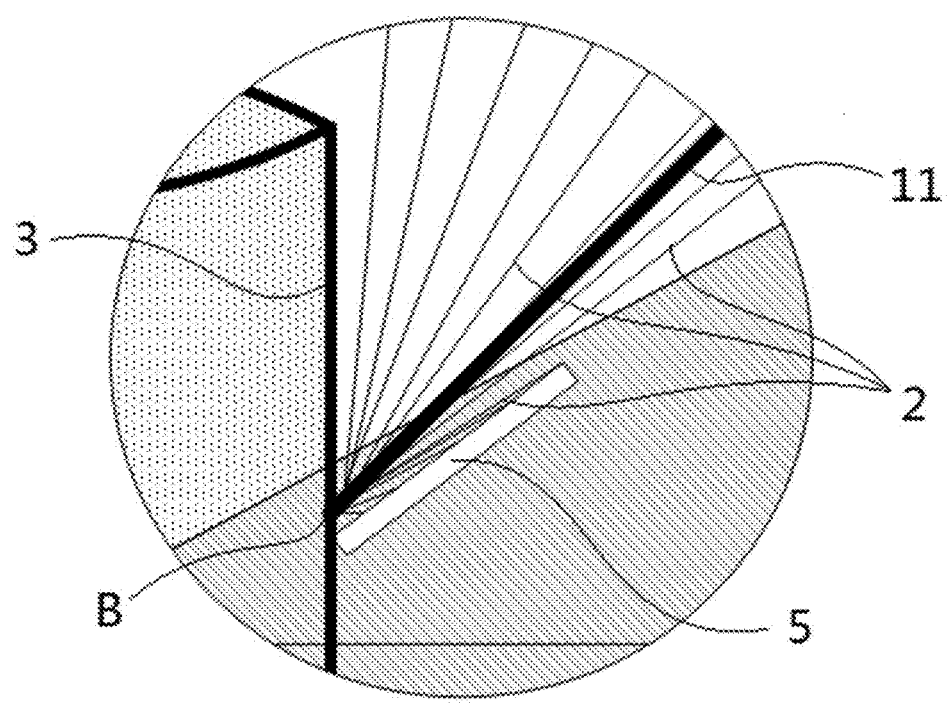
FIG. 3 is an enlarged diagram of the part within the circle in FIG. 2.

FIG. 2 is a schematic diagram of a non-contact type security inspection system according to an embodiment of the present disclosure. Referring to the enlarged schematic diagram shown in FIG. 3, the non-contact safety type security inspection system in the present embodiment includes a laser source 1, an optical collection device, a spectrum analyzer 8 and a shielding apparatus. The laser source 1 is used for emitting probing light beams 11 which penetrate through a container 3 or a packaging and are irradiated onto an inspected object 4 contained in the container 3 or the packaging, in other words, the probing light beams 11 from the laser source 1 are irradiated onto the container or the packaging containing the inspected object 4 so that the probing light beams 11 penetrates through the container 3 or the packaging to enter the inspected object 4. The probing light beams 11 emitted by the laser source 1 may include a single laser light ray, and may include one or more light beams formed by a plurality of laser light rays, and may also include a closed geometric cross section shape probing light beams 22 formed by a plurality of laser light beams shown in FIG. 6.

The optical collection device is used for collecting an exciting light excited by the probing light beams 11 on the inspected object 4. The optical collection device defines a predetermined collection optical path 9 from a sample area of the inspected object 4 to a lens 7 in the optical collection device, and the lens 7 can converge the collected exciting light to a photoelectric conversion device 6. The sample area may be a surface of the inspected object 4 or an interior of the inspected object 4. The spectrum analyzer 8 is used for analyzing spectral characteristics of the exciting light collected by the optical collection device so as to determine characteristics of the inspected object 4; and the spectrum analyzer 8 may include a Raman spectrum analyzer for analyzing Raman spectral characteristics of a scattered light collected by the optical collection device. Characteristics of the inspected object can be determined in a non-contact manner during the security inspection process through the analyzed Raman spectral characteristics, thereby identifying articles that have safety threat such as flammable and explosive substances. In other embodiments of the present disclosure, fluorescence or plasma or the like excited by the probing light beams on a surface or in an interior of the inspected object may be collected by the optical collection device, and the spectrum analyzer is used for analyzing spectral characteristics of the fluorescence or plasma collected by the optical collection device.

In one embodiment, the spectrum analyzer 8 can be electrically connected to the photoelectric conversion device 6, and receive an electrical signal converted from the photoelectric conversion device 6. In another embodiment of the present disclosure, the optical collection device may also adopt other known or new structures as long as it can implement collection of optical signals and can transmit the optical signals to the spectrum analyzer 8.

In the present embodiment, the shielding apparatus is used for preventing at least part of the exciting light (e.g., fluorescence 2) excited by the probing light beams 11 on the container 3 or the packaging from entering an induction area of the optical collection device. In other words, the shielding apparatus can be designed to block all of the exciting light excited by the probing light beams 11 on the container 3 or the packaging, or can be designed to block part of the exciting light as long as it does not affect subsequent spectral analysis. For example, in the case where the outer contour of the container or the packaging itself is irregular, if it is difficult to completely block all the exciting light excited by the probing light beams 11 on the container 3 or the packaging, the effect of excitation light can be reduced by blocking part of the excitation light, and the impact on inspection results in spectral analysis can still be reduced in further combination with related algorithms.

The shielding apparatus can be applied in the case where spectral characteristics of the exciting light (e.g., fluorescence 2) excited by the probing light beams 11 on the container 3 or the packaging are stronger than spectral characteristics of an exciting light excited by the probing light beams 11 on the inspected object 4. In other words, since the spectral characteristics of the exciting light excited by the probing light beams 11 on the container 3 or the packaging are stronger, it may have a significant impact on the inspection results when the exciting light is not blocked and directly enters the optical collection device, thereby causing the inspection results to be unavailable or difficult to process. Therefore, using the shielding apparatus in the present disclosure can prevent at least part of the exciting light excited by the probing light beams on the container or the packaging from entering the induction area of the optical collection device, the possibility of the exciting light excited by the probing light beams on the container or the packaging entering the collection optical path is effectively reduced, the interference with a spectral signal of the inspected object is significantly reduced; in addition, it is not required that the probing light beams keeps away from the collection optical path, thus further reducing the requirements for setting positions of the probing light beams and the collection optical path. Of course, in another embodiment, the shielding apparatus can be applied in the case where spectral characteristics of the exciting light excited by the probing light beams 11 on the container 3 or the packaging are weaker than or same to spectral characteristics of the exciting light excited by the probing light beams 11 on the inspected object 4.

When the shielding apparatus is provided, the shielding apparatus may be provided outside the container 3 or the packaging, which can conveniently block exciting light between the container 3 or the packaging and the optical collection device. Considering that if the shielding apparatus is far away from the container 3 or the packaging, there may be less blocked exciting light, thus the shielding apparatus may be provided adjacent to an outer surface of the container 3 or the packaging, for example, a partial structure of the shielding apparatus is attached to the outer surface of the container 3 or the packaging, or a gap of a small predetermined size is maintained. In the specific arrangement, the outer contour shape of the container 3 or the packaging is checked. According to the non-contact type security inspection system of the present disclosure, taking the fluorescence excited by the probing light beams on the container or the packaging as an example, the shielding apparatus is provided outside the container 3 or the packaging to block fluorescence as much as possible or at a position where the leaked fluorescence is insufficient to affect inspection results of the spectrum analyzer.

For the structural form of the shielding apparatus, relatively simple and easy manner to implement is the baffle as shown in FIG. 2, for example, the shielding apparatus includes a light shielding baffle 5. In order to prevent the exciting light (e.g., fluorescence 2) excited by the probing light beams 11 on the container 3 or the packaging from entering an induction area (e.g., lens 7 in FIG. 2) of the optical collection device, an extended plane of the light shielding baffle 5 in a direction away from the container 3 or the packaging and the induction area of the optical collection device are nonintersecting. That is, even if the fluorescence 2 is emitted outward along the surface of the light shielding baffle 5, it cannot enter the induction area of the optical collection device. Referring to FIG. 2, it can be seen that a plurality of rays of fluorescence 2 excited by the probing light beams 11 at an irradiation point of the container 3 are confined in an area between the light shielding baffle 5 and the container 3, which can neither enter the collection optical path 9, nor can be collected by the lens 7.

In the embodiment of FIG. 2, the laser source 1 is provided outside a predetermined collection optical path 9 defined by the optical collection device, which can simplify the structure and setting position of the shielding apparatus. In another embodiment of the present disclosure, the laser source 1 may also be provided within the predetermined collection optical path 9. Furthermore, referring to FIG. 3, an irradiation area B of the probing light beams 11 on the container 3 or the packaging may be located within a predetermined collection optical path 9 defined by the optical collection device. In yet another embodiment of the present disclosure, the irradiation area B may also be located outside the predetermined collection optical path 9 defined by the optical collection device.

Figure 4:
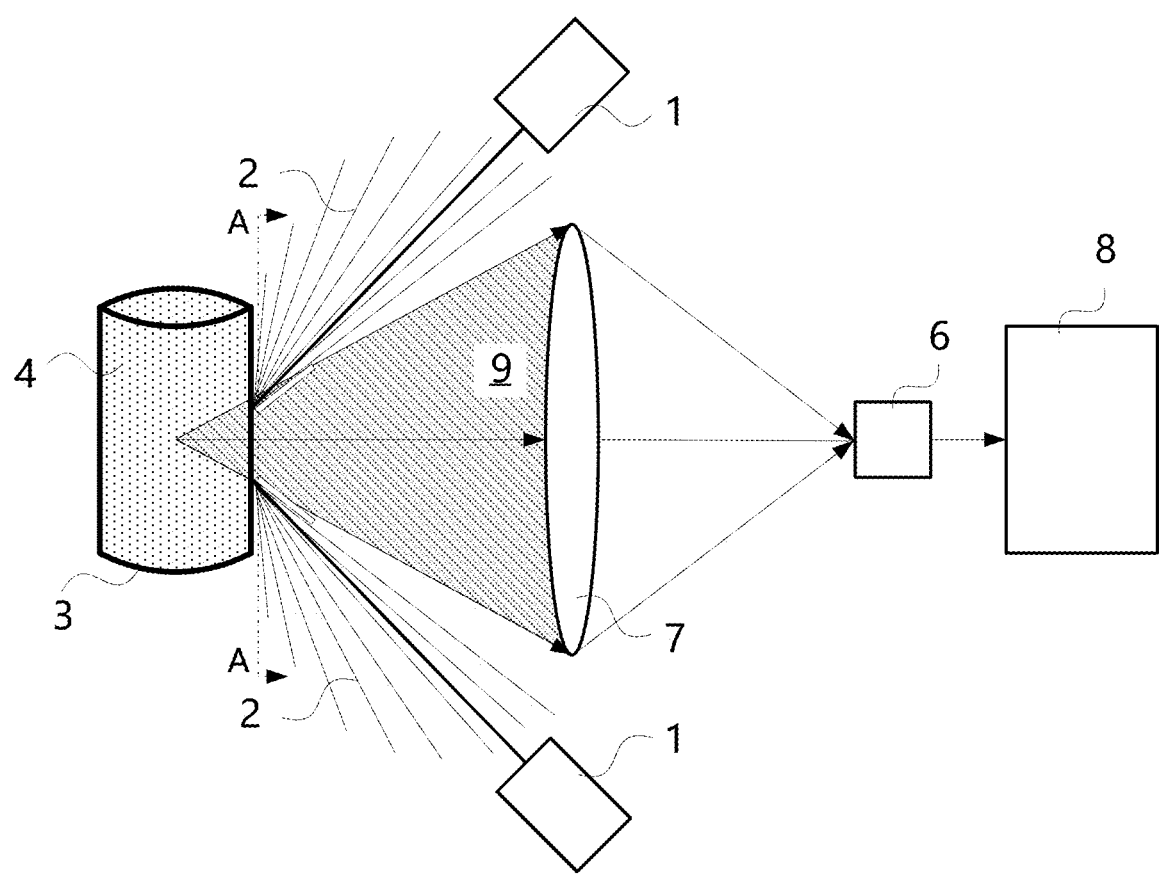
FIG. 4 is a schematic diagram of a non-contact type security inspection system according to another embodiment of the present disclosure.
Figure 5:
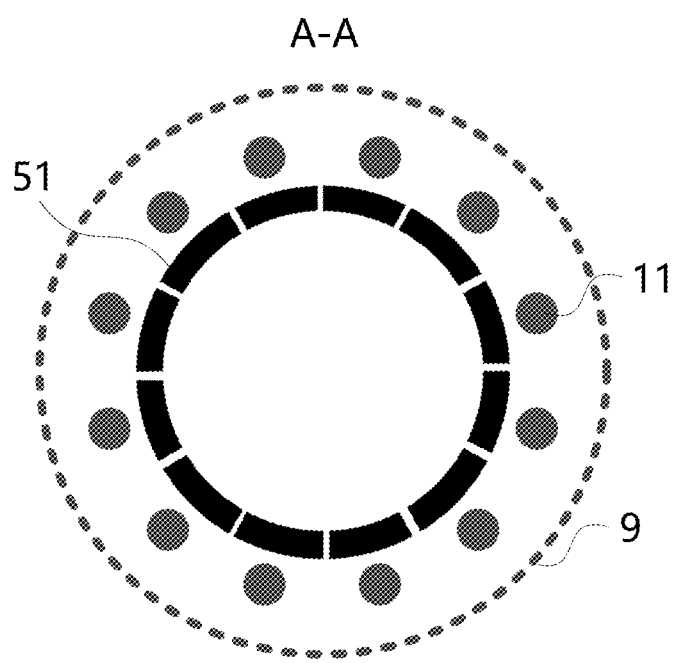
FIG. 5 is a schematic diagram of the A-A section according to the embodiment in FIG. 4.

In the embodiment of FIG. 2, a single laser source is used for emitting a probing light beams. In another embodiment of the present disclosure, a single laser source can emit a plurality of probing light beams by some existing optical elements. In other embodiments, there may be a plurality of laser sources capable of emitting a plurality of probing light beams 11 to the container 3 or the packaging. As shown in FIG. 4, there may be two or more laser sources, and two laser sources that are symmetrical with respect to the horizontal line can be seen from FIG. 4. If there are laser sources at other positions, they cannot be directly shown in FIG. 4. As can be seen from the schematic diagram of the A-A section of FIG. 4 as shown in FIG. 5, the positions at which the plurality of probing light beams 11 is emitted are within the aperture of the predetermined collection optical path 9. If no shielding apparatus is provided, generally the exciting light (e.g., fluorescence 2) excited by the probing light beams 11 on the container 3 or the packaging may enter the induction area of the optical collection device in a large amount, and by providing a shielding apparatus adjacent to each of the probing light beams 11 outside the container 3 or the packaging, at least part of the exciting light (e.g., fluorescence 2) is effectively prevented from entering the induction area of the optical collection device.

In FIG. 5, the shielding apparatus includes first light shielding baffles 51 having a cross section with an annular sector shape, the number of the first light shielding baffles 51 may match the number of the probing light beams 11, and the first light shielding baffles 51 corresponding to the probing light beams 11 can jointly form a non-closed annular cross section shape such that at least part of the exciting light excited by the plurality of probing light beams 11 on the container or the packaging is blocked outside the induction area of the optical collection device.

Figure 6:
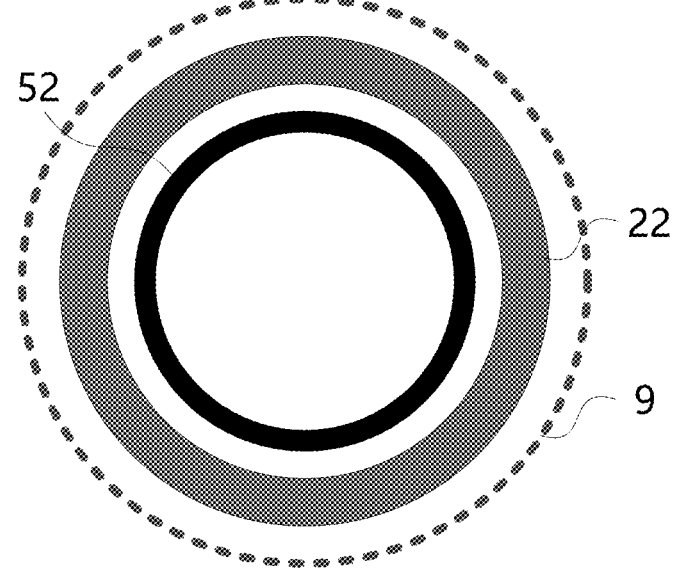
FIG. 6 is a schematic diagram of a section of a non-contact type security inspection system according to still another embodiment of the present disclosure.

In addition to the plurality of probing light beams, in another embodiment, the laser source 1 is capable of emitting a probing light beam 22 with a closed geometric cross section shape to the container 3 or the packaging. For example, FIG. 6 shows the closed annular probing light beam. Correspondingly, in order to minimize the leakage of exciting light excited by the probing light beams 11 on the container 3 or the packaging to the induction area of the optical collection device, a shielding apparatus with a closed geometric cross section shape is provided adjacent to the probing light beam 22 with a closed geometric cross section shape outside the container 3 or the packaging. In one embodiment, a shielding apparatus including a second light shielding baffle 52 with a closed annular cross section shape may be used.

The non-contact type security inspection system of the present disclosure has been described in detail above. The present disclosure further provides a non-contact type security inspection method, and execution subjects of steps in the method are not limited to the components of the non-contact type security inspection system. In an embodiment of the present disclosure, the method includes:

probe light beams 11 being directed to penetrate through a container 3 or a packaging and irradiated onto an inspected object 4 contained in the container 3 or the packaging;

collecting an exciting light excited by the probe light beams 11 on the inspected object 4 by an optical collection device; and analyzing spectral characteristics of the exciting light collected by the optical collection device so as to determine characteristics of the inspected object 4;

and at least part of the exciting light excited by the probe light beams 11 on the container 3 or the packaging is prevented from entering an induction area of the optical collection device by a shielding apparatus.

In the present embodiment, the step of analyzing spectral characteristics of a scattered light collected by the optical collection device may be implemented by a spectrum analyzer 8, and a Raman spectrum analyzer may be used for analyzing Raman spectral characteristics of the scattered light collected by the optical collection device. In another embodiment, a fluorescence spectrum analyzer or a plasma spectrum analyzer may be used for analyzing spectral characteristics of fluorescence or plasma that is collected by the optical collection device and excited by the probing light beams on a surface or in an interior of the inspected object. In another embodiment, the step of that probe light beams are directed 11 to penetrate through a container 3 or a packaging and be irradiated onto an inspected object 4 contained in the container 3 or the packaging includes:

the probe light beams 11 are directed, from a laser source 1 provided outside a predetermined collection optical path 9 defined by the optical collection device, to penetrate through a container 3 or a packaging and irradiated onto an inspected object 4 contained in the container 3 or the packaging.

In another embodiment, the laser source 1 may also be located within the predetermined collection optical path 9. Furthermore, an irradiation area B of the laser source on the container 3 or the packaging may be located within the predetermined collection optical path 9 defined by the optical collection device. In yet another embodiment of the present disclosure, the irradiation area B may also be located outside the predetermined collection optical path 9 defined by the optical collection device.

Further, the step of that probe light beams 11 are directed to penetrate through a container 3 or a packaging and irradiated onto an inspected object 4 contained in the container 3 or the packaging includes:

a plurality of probe light beams 11 or a probe light beam 22 with a closed geometric cross section shape is directed from a laser source 1 to penetrate through a container 3 or a packaging and irradiated onto an inspected object 4 contained in the container 3 or the packaging.

The above method embodiments can be applied in the case where spectral characteristics of the exciting light (e.g., fluorescence 2) excited by the probing light beams 11 on the container 3 or the packaging are stronger than spectral characteristics of an exciting light excited by the probing light beams 11 on the inspected object 4, and can also be applied in the case where spectral characteristics of the exciting light excited by the probing light beams 11 on the container 3 or the packaging are weaker than or same to spectral characteristics of the exciting light excited by the probing light beams 11 on the inspected object 4.

The invention claimed is:

1. A non-contact type security inspection system, comprising:
   a laser source configured to emit probe light beams which penetrate through a container or a packaging and are irradiated onto an inspected object contained in the container or the packaging;
   an optical collection device configured to collect an exciting light excited by the probe light beams on the inspected object;
   a spectrum analyzer configured to analyze spectral characteristics of the exciting light collected by the optical collection device so as to determine characteristics of the inspected object; and
   a shielding apparatus configured to prevent at least part of the exciting light excited by the probe light beams on the container or the packaging from entering an induction area of the optical collection device, wherein the exciting light excited by the probe light beams on the container or the packaging is Raman scattering light.

2. The non-contact type security inspection system according to claim 1, wherein the shielding apparatus is provided outside the container or the packaging.

3. The non-contact type security inspection system according to claim 2, wherein the shielding apparatus is provided adjacent to an outer surface of the container or the packaging.

4. The non-contact type security inspection system according to claim 1, wherein the shielding apparatus comprises a light shielding baffle, and an extended plane of the light shielding baffle in a direction away from the container or the packaging and the induction area of the optical collection device are nonintersecting.

5. The non-contact type security inspection system according to claim 1, wherein the laser source is located outside a predetermined collection optical path defined by the optical collection device.

6. The non-contact type security inspection system according to claim 1, wherein an irradiation area of the container or the packaging irradiated by the probe light beams is located within a predetermined collection optical path defined by the optical collection device.

7. The non-contact type security inspection system according to claim 1, wherein one or more laser sources are configured to emit a plurality of probe light beams to the container or the packaging, and the shielding apparatus is provided close to each of the probe light beams outside the container or the packaging.

8. The non-contact type security inspection system according to claim 7, wherein the shielding apparatus comprises first light shielding baffles having a cross section with an annular sector shape, and the first light shielding baffles corresponding to the probe light beams form a non-closed annular cross section shape.

9. The non-contact type security inspection system according to claim 1, wherein the laser source is configured to emit a probe light beam with a closed geometric cross section shape to the container or the packaging, and the shielding apparatus with a closed geometric cross section shape is provided adjacent to the laser beam outside the container or the packaging.

10. The non-contact type security inspection system according to claim 9, wherein the shielding apparatus comprises a second light shielding baffle with a closed annular cross section shape.

11. The non-contact type security inspection system according to claim 1, wherein spectral characteristics of the exciting light excited by the probe light beams on the container or the packaging are stronger than spectral characteristics of an exciting light excited by the probe light beams on the inspected object.

12. The non-contact type security inspection system according to claim 1, wherein the spectrum analyzer comprises a Raman spectrum analyzer configured to analyze Raman spectral characteristics of a scattered light collected by the optical collection device.

13. A non-contact type security inspection method, comprising:
   probe light beams being directed to penetrate through a container or a packaging and irradiated onto an inspected object contained in the container or the packaging;
   collecting an exciting light excited by the probe light beams on the inspected object by an optical collection device; and
   analyzing spectral characteristics of the exciting light collected by the optical collection device so as to determine characteristics of the inspected object;
   wherein at least part of the exciting light excited by the probe light beams on the container or the packaging is prevented from entering an induction area of the optical collection device by a shielding apparatus, and the exciting light excited by the probe light beams on the container or the packaging is Raman scattering light.

14. The non-contact type security inspection method according to claim 13, wherein the step of that probe light beams are directed to penetrate through a container or a packaging and be irradiated onto an inspected object contained in the container or the packaging comprises:
   the probe light beams are directed, from a laser source provided outside a predetermined collection optical path defined by the optical collection device, to penetrate through a container or a packaging and irradiated onto an inspected object contained in the container or the packaging.

15. The non-contact type security inspection method according to claim 13, wherein an irradiation area on the container or the packaging irradiated by the probe light beams is located within a predetermined collection optical path defined by the optical collection device.

16. The non-contact type security inspection method according to claim 13, wherein the step of that probe light beams are directed to penetrate through a container or a packaging and irradiated onto an inspected object contained in the container or the packaging comprises:
   a plurality of probe light beams or a probe light beam with a closed geometric cross section shape is directed from a laser source to penetrate through a container or a packaging and irradiated onto an inspected object contained in the container or the packaging.

17. The non-contact type security inspection method according to claim 13, wherein spectral characteristics of the exciting light excited by the probe light beams on the container or the packaging are stronger than spectral characteristics of an exciting light excited by the probe light beams on the inspected object.

18. The non-contact type security inspection method according to claim 13, wherein the step of analyzing spectral characteristics of the exciting light collected by the optical collection device comprises: analyzing Raman spectral characteristics of a scattered light collected by the optical collection device.

\* \* \* \* \*